US012503734B2

(12) United States Patent
Nakashima et al.

(10) Patent No.: US 12,503,734 B2
(45) Date of Patent: Dec. 23, 2025

(54) CELLULOSE SACCHARIFICATION METHOD

(71) Applicant: SEIKO EPSON CORPORATION, Tokyo (JP)

(72) Inventors: Yoshiki Nakashima, Nagano (JP); Hideki Tanaka, Nagano (JP); Yoko Nakai, Nagano (JP); Sayaka Yamasaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 475 days.

(21) Appl. No.: 18/188,507

(22) Filed: Mar. 23, 2023

(65) Prior Publication Data

US 2023/0304109 A1 Sep. 28, 2023

(30) Foreign Application Priority Data

Mar. 25, 2022 (JP) ................................ 2022-049604

(51) Int. Cl.
*C13K 1/02* (2006.01)
*C08B 1/00* (2006.01)

(52) U.S. Cl.
CPC ................ *C13K 1/02* (2013.01); *C08B 1/003* (2013.01)

(58) Field of Classification Search
CPC ..................................................... C08B 1/003
See application file for complete search history.

(56) References Cited

U.S. PATENT DOCUMENTS

2009/0053777 A1* 2/2009 Hennessey ................ C12P 7/10 435/158
2015/0037848 A1 2/2015 Yano
2015/0284755 A1* 10/2015 Medoff ................ B01F 23/231 435/162
2019/0093136 A1* 3/2019 Battista .................. C12P 19/02

FOREIGN PATENT DOCUMENTS

WO 2009/045651 A2 4/2009
WO 2010/093832 A1 8/2010
WO 2013/136940 A1 9/2013

OTHER PUBLICATIONS

Da Silva Ayla Sant'Ana et al: "Constraints and advances in high-solids enzymatic hydrolysis of lignocellulosic biomass: a critical review", Biotechnology for Biofuels, vol. 13, No. 1, Mar. 23, 2020 (Mar. 23, 2020).

* cited by examiner

*Primary Examiner* — Anshu Bhatia
(74) *Attorney, Agent, or Firm* — Global IP Counselors, LLP

(57) ABSTRACT

A cellulose saccharification method including an introduction step of introducing water, a raw material containing cellulose, and a surfactant into a saccharification vessel so as to obtain a liquid mixture, an agitation step of agitating the liquid mixture due to rotation of an impeller portion, and a detection step of detecting a torque sensed by the impeller portion, wherein regarding the agitation step, after agitation is performed until an amount of the torque changed in a unit time period becomes less than or equal to a predetermined value, when the torque is more than or equal to a threshold value, the surfactant is additionally introduced into the liquid mixture, or when the torque is less than the threshold value, a pH adjuster and an enzyme are introduced into the liquid mixture.

5 Claims, 4 Drawing Sheets

CELLULOSE SACCHARIFICATION METHOD

The present application is based on, and claims priority from JP Application Serial Number 2022-049604, filed Mar. 25, 2022, the disclosure of which is hereby incorporated by reference herein in its entirety.

BACKGROUND

1. Technical Field

The present disclosure relates to a cellulose saccharification method.

2. Related Art

Obtaining glucose through cellulose saccharification has attracted great amounts of attention from the viewpoint of so-called carbon minus, effective utilization of biomass, application to bioethanol, and the like. For example, JP-T-2012-517243 discloses a method for producing a saccharide by mixing cellulose and a saccharification agent (enzyme) in a solution. In addition, the literature discloses that a saccharification speed can be increased by including a surfactant in the solution.

As disclosed in JP-T-2012-517243, regarding cellulose saccharification, there is a method in which cellulose is saccharified by introducing a raw material and a reaction solution containing an enzyme into a saccharification vessel and performing agitation so as to facilitate advance of an enzyme reaction, and it is conjectured that using a surfactant enables the cellulose to be readily immersed in the reaction solution.

However, it is conjectured that excessive addition of the surfactant increases the area of the cellulose surface and the enzyme surface covered by the surfactant, and there is a concern that contact between the enzyme and the cellulose may be suppressed from occurring and that the enzyme reaction is not limited to readily advancing.

SUMMARY

According to an aspect of the present disclosure, a cellulose saccharification method includes an introduction step of introducing water, a raw material containing cellulose, and a surfactant into a saccharification vessel so as to obtain a liquid mixture, an agitation step of agitating the liquid mixture due to rotation of an impeller portion, and a detection step of detecting a torque sensed by the impeller portion, wherein regarding the agitation step, after agitation is performed until an amount of the torque changed in a unit time period becomes less than or equal to a predetermined value, when the torque is more than or equal to a threshold value, the surfactant is additionally introduced into the liquid mixture, or when the torque is less than the threshold value, a pH adjuster and an enzyme are introduced into the liquid mixture.

DESCRIPTION OF EXEMPLARY EMBODIMENTS

Embodiments according to the present disclosure will be described below. The embodiments described below explain examples of the present disclosure. The present disclosure is not limited to the following embodiments and includes various modified embodiments performed within the bound of not changing the scope of the present disclosure. In this regard, all configurations described below are not limited to being configurations indispensable to the present disclosure.

A cellulose saccharification method according to the present embodiment includes an introduction step of introducing water, a raw material containing cellulose, and a surfactant into a saccharification vessel so as to obtain a liquid mixture, an agitation step of agitating the liquid mixture due to rotation of an impeller portion, and a detection step of detecting a torque sensed by the impeller portion. Regarding the agitation step, after agitation is performed until an amount of the torque changed in a unit time period becomes less than or equal to a predetermined value, when the torque is more than or equal to a threshold value, the surfactant is additionally introduced into the liquid mixture, or when the torque is less than the threshold value, a pH adjuster and an enzyme are introduced into the liquid mixture.

1. Introduction Step

The introduction step is a step of introducing water, a raw material containing cellulose, and a surfactant into a saccharification vessel so as to obtain a liquid mixture.

1.1. Saccharification Vessel

There is no particular limitation regarding the saccharification vessel provided that the raw material and a liquid can be introduced and that contents can be agitated. There is no particular limitation regarding the scale of the saccharification vessel, and the scale may be a laboratory scale such as a beaker or a flask, may be a pilot plant scale, or may be a commercial plant scale.

The saccharification vessel may include a container and a lid. The saccharification vessel may appropriately include inlets of the raw material and the liquid, an outlet of a product, a mechanism for agitating the interior, a window for observing the interior, a heater, a coolant pipeline, a jacket, and the like for heating and cooling, and other pipelines. Further, the saccharification vessel may include a liquid-level gauge, a thermometer, and the like and may have an opening for installing these.

Figure 1:
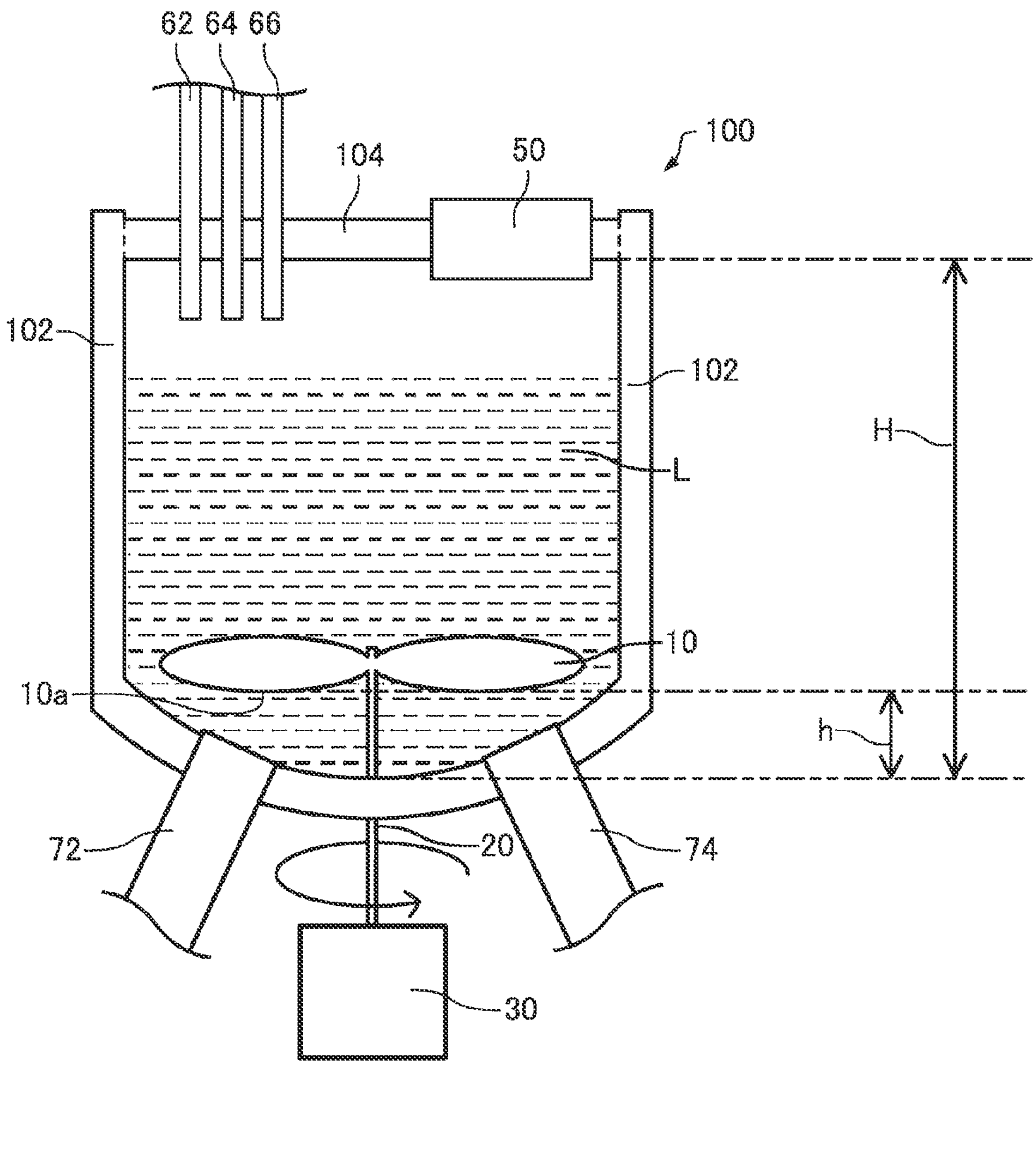
FIG. 1 is a schematic diagram illustrating an example of a saccharification vessel according to an embodiment.

FIG. 1 is a schematic diagram illustrating a saccharification vessel 100 that is an example of a saccharification vessel configured to performing the saccharification method according to the present disclosure. As illustrated in FIG. 1, a mixture L in which a raw material is mixed is introduced in the saccharification vessel 100. the mixture L is agitated due to an agitation shaft 20 and an agitation impeller 10 being rotated by a motor 30.

In the example illustrated in FIG. 1, a container 102 is closed by a lid 104. The lid 104 is provided with an inlet 50 for introducing the raw material into the interior of the saccharification vessel 100, a tube 62 for introducing an enzyme, a tube 64 for introducing a surfactant, and a tube 66 for introducing a PH adjuster. In addition, a recovery line 72 for recovering a liquid after a reaction from the saccharification vessel 100 and a residue drain 74 for discharging a residue after the liquid is discharged are disposed in the lower portion of the container 102.

1.2. Raw Material

The raw material introduced into the saccharification vessel includes the water and the cellulose. The raw material may contain components other than the water and the cellulose. Examples of the component other than the water and the cellulose include components derived from wood such as lignin and hemicellulose, processed wood components such as fillers, pigments, resin components, clays, binders, toners, and oil contents.

The water may be water in which ionic impurities are minimized and may be, for example, pure water or ultrapure water such as ion-exchanged water, ultrafiltered water, reverse osmosis water, or distilled water. In this regard, using of the water sterilized through ultraviolet irradiation, addition of hydrogen peroxide, or the like is favorable since molds and bacteria can be suppressed from being generated when a liquid is stored for a long time, during an enzyme reaction, or after the enzyme reaction.

The cellulose may be derived from paper, pulp, or the like. Using paper as a raw material enables the raw material to be readily provided. In this regard, the paper may include waste printed paper. Examples of the waste printed paper include copier paper, newspaper, and magazines. Using the waste printed paper is favorable since, for example, environmental resources and underground resources are saved and waste disposal can be reduced.

The paper, the waste paper, or the like in a pulverized state may be introduced into the saccharification vessel. Pulverization may be performed through, for example, cutting by using a shredder or the like or pulverization by using a dry-type defibrating machine or the like. In addition, pulverization may be performed through, wet type disaggregation. The raw material being in a pulverized or coarsely crushed state enables the efficiency of a saccharification step to be improved since components other than cellulose, which are contained in the raw material, are readily isolated from the cellulose and since the cellulose readily comes into contact with the liquid mixture. In addition, the pulverized waste paper or the like having increased surface area enables the efficiency of the enzyme reaction to be improved. Further, the pulverized waste paper or the like contains air so as to have a reduced specific gravity and is not limited to being readily immersed in the liquid. Even in such an instance, according to the saccharification method according to the present embodiment, an effect of enabling the saccharification reaction being hindered from advancing to be reduced can be more remarkedly obtained by a smaller amount of surfactant being used.

When the raw material includes paper containing a filler, hydrophobicity may be developed and the paper is not limited to being readily immersed in the liquid mixture. However, immersion is readily performed by using the saccharification method according to the present embodiment, and an effect of enabling the saccharification reaction being hindered from advancing due to introduction of an excessive amount of the surfactant to be reduced can be more remarkedly obtained while the saccharification reaction is facilitated by the surfactant.

More favorably, the raw material is used in a sterilized state. Examples of the sterilization technique include high-pressure-heated steam and ultraviolet irradiation. According to such a method, glucose and the like generated by the saccharification reaction are not readily consumed by microorganisms and the like derived from the raw material, and the yield of the saccharide may be increased.

The amounts of the water and the cellulose introduced into the saccharification vessel in the introduction step are appropriately set in accordance with the scale and the capacity of the saccharification vessel. In this regard, the mixing ratio of the water and the cellulose can also be appropriately set and is, for example, 30 parts of cellulose and preferably 15 parts of cellulose relative to 100 parts of water on a part by mass basis.

1.3. Surfactant

There is no particular limitation regarding the use of the surfactant provided that the enzyme reaction is not hindered. The surfactant being mixed into the liquid mixture enables the liquid to readily get wet with cellulose so as to improve the efficiency of the saccharification reaction.

Examples of the surfactant include anionic surfactants, cationic surfactants, nonionic surfactants, polycyclic-phenyl-ether-based surfactants, sorbitan derivatives, and fluorine-based surfactants, and these may be used alone or at least two types may be used in combination.

In this regard, in the saccharification method according to the present embodiment, it is more favorable that nonionic (non-ion-based) surfactants such as acetylene-glycol-based surfactants, silicone-based surfactants, fluorine-based surfactants, polysiloxane-based surfactants, polyether-based surfactants, and aliphatic-acid-ester-based surfactants be used. For example, using a commercially available nonionic surfactant such as TritonX-100 (produced by NACALAI TESQUE, INC.), Antifoam SE-15 (produced by Sigma-Aldrich Japan), ADEKA NOL LG-126 (produced by ADEKA Corporation), DK ESTER F-10 (produced by Daiichi Kogyo Seiyaku Co., Ltd.), or KM-72 (produced by Shin-Etsu Chemical Co., Ltd.) enables the saccharification reaction to be further facilitated since the surfactant does not have an electric charge so as not to readily hinder the function of the enzyme.

More favorably, of the surfactants, a surfactant having a defoaming effect is selected. The surfactant having the defoaming effect enables bubbles to be suppressed from being generated during the agitation step and enables foams to be readily deformed even when the foams are generated. Consequently, over flowing of the mixture from the saccharification vessel and plugging in the pipeline can be suppressed from occurring.

Examples of the acetylene-glycol-based surfactant include 2,4,7,9-tetramethyl-5-decyne-4,7-diol and 2,4,7,9-tetramethyl-5-decyne-4,7-diol alkylene oxide adducts, and 2,4-dimethyl-5-decyn-4-ol and 2,4-dimethyl-5-decyn-4-ol alkylene oxide adducts. Examples of the commercially available acetylene-glycol-based surfactant include OLFIN 104 Series, E Series of OLFIN E1010, OLFIN B, Y, P, A, STG, SPC, PD-001, PD-002W, PD-003, and PD-004 (product names, produced by Nisshin Chemical Industry Co., Ltd.), Surfynol 465, 61, and DF110D, Surfynol 104 Series, 420, 440, 465, 485, SE, SE-F, 504, 61, DF37, CT111, CT121, CT131, CT136, TG, and GA (product names, produced by Air Products Japan, Inc.), and Acetylenol E00, E00P, E40, and E100, (product names, produced by Kawaken Fine Chemicals Co., Ltd.).

The silicone-based surfactant is favorably a polysiloxane-based compound. Examples of the polysiloxane-based compound include polyether-modified organosiloxanes. Examples of the commercially available product of the polyether-modified organosiloxane include BYK-020, BYK-021, BYK-022, BYK-023, BYK-0234, BYK-044, BYK-093, BYK-094, BYK-306, BYK-307, BYK-333, BYK-341, BYK-345, BYK-346, BYK-348, BYK-349, BYK-3420, BYK-3480, and BYK-3481 (product names, produced by BYK), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017, KM-73A, KM-73E, KM-71, KM-75, KM-85, KM-89, KM-98, KM-7752, KS-531, KS-540, KS-530, KS-537, and KS-538 (product names, produced by Shin-Etsu Chemical Co., Ltd.), TSA6406, TSA780, TSA739, and TSA775 (product names, produced by Momentive Performance Materials Japan LLC), and 3-dimensional siloxane "FOAM BAN (registered trademark) MS-575" (product name, produced by Munzing).

Regarding the fluorine-based surfactant, a fluorine-modified polymer is favorably used, and specific examples include BYK-3440 (produced by BYK Japan KK), SURFLON S-241, S-242, and S-243 (all trade names, produced by AGC SEIMI CHEMICAL CO., LTD.), and Ftergent 215M (produced by NEOS COMPANY LIMITED).

In the saccharification method according to the present disclosure, a small amount of the surfactant is introduced into the saccharification vessel during the introduction step. When the amount of the surfactant introduced into the saccharification vessel during the introduction step is excessively large, it is conjectured that the area of the cellulose surface and the enzyme surface covered by the surfactant is increased, and there is a concern that contact between the enzyme and the cellulose may be suppressed from occurring and that the enzyme reaction is not limited to readily advancing. Consequently, the amount of the surfactant introduced into the saccharification vessel during the introduction step is 10 parts by mass or less, preferably 3 parts by mass or less, and more preferably 1 part by mass or less relative to 100 parts by mass of the water.

2. Agitation Step

In the agitation step, the liquid mixture is agitated due to rotation of the impeller portion. Agitation is performed by an agitation mechanism including the impeller portion in the saccharification vessel.

Examples of the agitation mechanism include magnetic stirrers and stirring bars, agitation motors, shafts and agitation impellers, and combinations thereof, and the agitation mechanism can be appropriately selected in accordance with the scale and the agitation efficiency of the contents. Regarding these examples, the impeller portion corresponds to the stirring bar or the agitation impeller.

The impeller portion is located more favorably in the bottom portion of the saccharification vessel. That is, it is more favorable that the lowermost portion of a member of the impeller portion be close to the lowermost portion of the space in the container of the saccharification vessel. For example, the distance between the lowermost portion of a member of the impeller portion and the lowermost portion of the space in the container of the saccharification vessel is preferably 0.3 or less, more preferably 0.2 or less, and further preferably 0.1 or less, wherein the distance from the lowermost portion of the space in the container of the saccharification vessel to the uppermost portion of the space in the container of the saccharification vessel is assumed to be 1.

The impeller portion being arranged in such a manner enables the torque that is changed in accordance with an immersion state of the cellulose to be sensed with higher sensitivity.

In the saccharification vessel 100 illustrated in FIG. 1, the agitation impeller 10 corresponds to the impeller portion. In the saccharification vessel 100, a ratio (h/H) is substantially 0.17, wherein the distance from the lowermost portion of the space in the container of the saccharification vessel 100 to the uppermost portion of the space in the container of the saccharification vessel is denoted as a distance H, and the distance between the lowermost portion 10*a* of the member of the impeller portion (agitation impeller 10) and the lowermost portion of the space in the container of the saccharification vessel is denoted as a distance h.

3. Detection Step

In the detection step, the torque sensed by the impeller portion is detected. The torque can be detected by, for example, monitoring a current or a load of the motor for rotating the impeller portion. An introduction timing of the surfactant and introduction timings of the pH adjuster and the enzyme in the agitation step are determined in accordance with the torque value detected in the detection step.

The torque value monitored in the detection step differs with the shape of the impeller portion, the rotational speed, the scale and the shape of the saccharification vessel, and the like. The torque value is monitored in a state in which the rotational speed of at least the impeller portion is set to be constant.

4. Introduction of Surfactant, pH Adjuster, and Enzyme

In the saccharification method according to the present embodiment, the saccharification reaction is started by introducing the pH adjuster and the enzyme, and before the pH adjuster and the torque are introduced, an appropriate amount of the surfactant is introduced into the saccharification vessel. That is, in the agitation step, the torque obtained in the detection step is monitored, and the agitation step is performed until an amount of the torque changed in a unit time period becomes less than or equal to a predetermined value. Thereafter, when the torque is more than or equal to a threshold value, the surfactant is introduced into the liquid mixture, or when the torque is less than the threshold value, the pH adjuster and the enzyme are introduced into the liquid mixture. In this regard, the predetermined range in which the torque value becomes constant in a unit time period and the threshold value are appropriately set in accordance with the configuration and the scale of the saccharification vessel, properties and amounts of the introduced materials, and the capacity and the speed of agitation.

Figure 2:
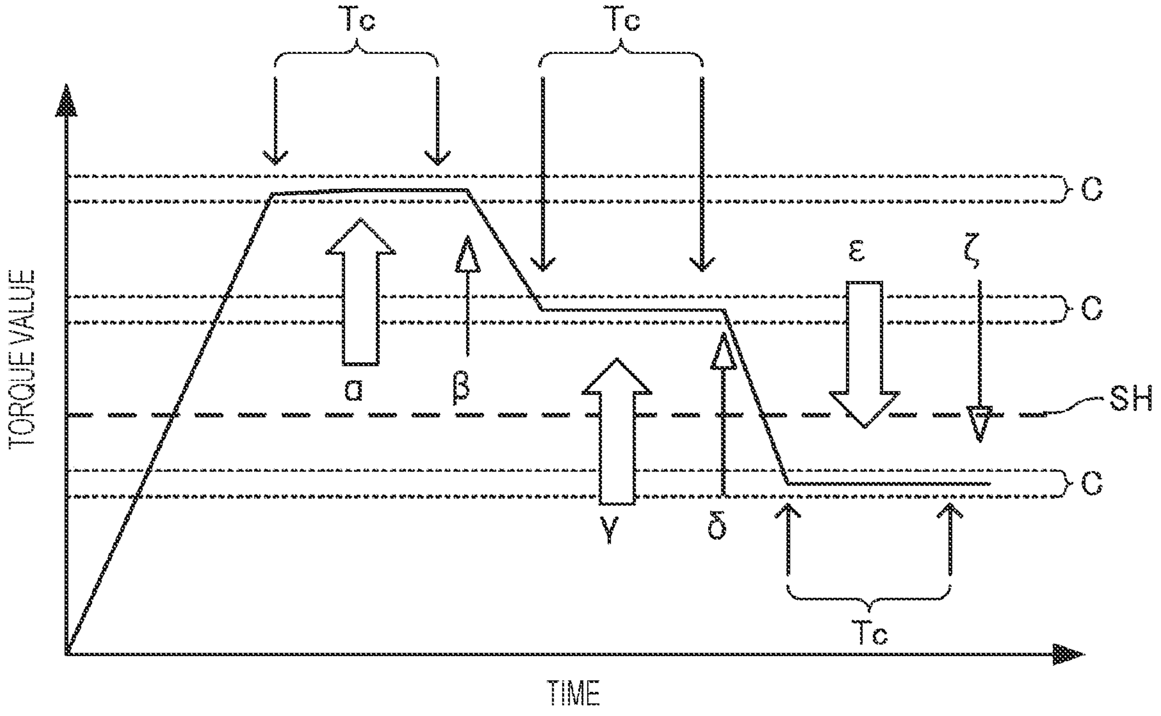
FIG. 2 is a graph schematically illustrating a change over time of a torque value.
Figure 3A:
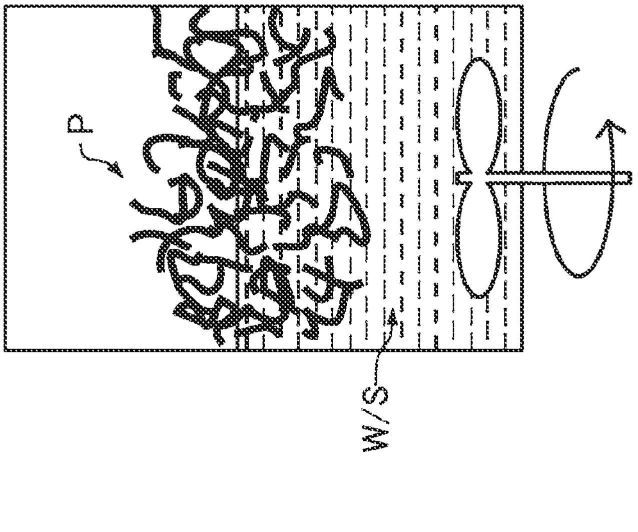
FIGS. 3A to 3C are schematic diagrams illustrating substances in a saccharification vessel during agitation.
Figure 3B:
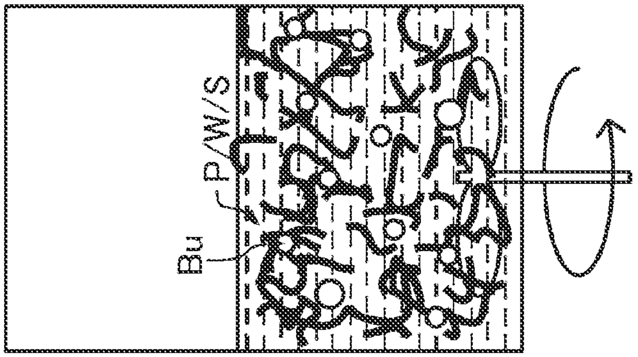
Figure 3C:
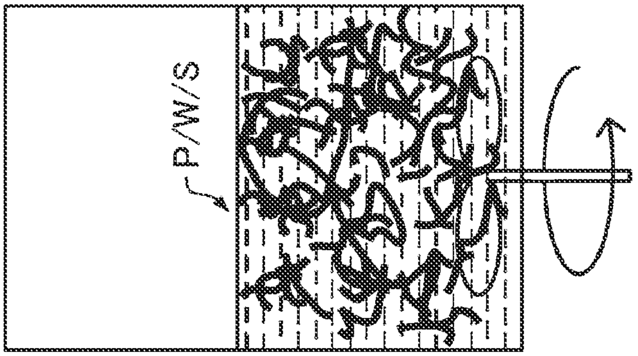

FIG. 2 is a graph schematically illustrating a change over time of the torque value sensed by the impeller portion during the agitation step. FIGS. 3A to 3C schematic illustrate substances in a saccharification vessel during agitation.

After the raw material and the surfactant are introduced, when the impeller portion is started to rotate, the torque value is changed in accordance with the mixing state of the liquid mixture. As illustrated in FIG. 3A, mixing of the water/surfactant (W/S) and the paper (P) in the saccharification vessel is started due to rotation of the impeller portion. At the beginning of the mixing, the paper (P) is in the state of floating on the liquid (W/S).

Thereafter, as the agitation advances, a time region in which the torque value is within a predetermined range C and, therefore, is not changed in a unit time period Tc (hereafter also referred to as "planar region") appears, as represented by "α" in FIG. 2, wherein one of the causes is a mixing state of the liquid mixture being uniform. It is conjectured that, in the region "α", a mixture (P/W/S) of paper/water/surfactant is formed taking on a state in which bubbles (Bu) are included, as illustrated in FIG. 3B.

In the example illustrated in FIG. 2, the torque value in the first planar region is higher than the threshold value SH. Therefore, the surfactant is added to the liquid mixture at the point in time represented by "β" in the drawing. When monitoring of the torque value is continued, the torque value is reduced in accordance with the mixing state of the liquid mixture, and a planar region in which the torque value is within a predetermined range C and, therefore, is not changed in a unit time period Tc, as represented by "γ" in the drawing, appears. In the region "γ", a mixture (P/W/S) of paper/water/surfactant, as illustrated in FIG. 3B, is also formed, and it is conjectured that the state in which bubbles (Bu) are included is still left.

The torque value in the planar region that appears for a second time is left to be higher than the threshold value SH. Therefore, the surfactant is added to the liquid mixture at the point in time represented by "δ" in FIG. 2. When monitoring of the torque value is continued, the torque value is reduced in accordance with the mixing state of the liquid mixture, and a planar region in which the torque value is within a predetermined range C and, therefore, is not changed in a unit time period Tc, as represented by "ε" in the drawing, appears. It is conjectured that, in the region "ε", a mixture (P/W/S) of paper/water/surfactant, as illustrated in FIG. 3C, is formed so as to take on a uniform mixing state in which bubbles (Bu) are reduced and immersed paper (P) is defibrated.

The torque value in the planar region that appears for a third time is lower than the threshold value SH. Therefore, the enzyme and the pH adjuster are introduced into the reaction vessel at the point in time represented by "ζ" in FIG. 2. Consequently, since the interior of the saccharification vessel is in a state in which a minimum amount of the surfactant required for dispersing the paper (P) is added, a cellulose saccharification reaction due to the enzyme can advance while the surfactant is prevented from hindering the reaction.

Examples of the pH adjuster include at least one selected from organic acids, inorganic acids, organic alkalis, and inorganic alkalis, such as acetic acid, citric acid, and phosphoric acid, salts thereof, such as sodium salts, and substances constituting buffer solutions.

Regarding the enzyme, an enzyme having a function of decomposing cellulose into a saccharide by cleaving a β-1,4-glucoside bond can be used. Examples of the cellulolytic enzyme include endoglucanase, cellobiohydrolase, and cellobiase (β-glucosidase). More specific Examples of the cellulolytic enzyme include Cellulase SS (produced by Nagase ChemteX Corporation), Accellerase Duet (produced by GENENCOR), Cellic Ctec2 (produced by Novozymes), Cellic Ctec3 (produced by Novozymes), and Meicelase (produced by Meiji Seika Pharma Co., Ltd.), and a plurality of types of these enzymes may be used in combination. In this regard, to simultaneously decompose xylan present on the cellulose surface so as to increase the saccharification efficiency, xylanase may be contained.

5. Flow of Saccharification Method

Figure 4:
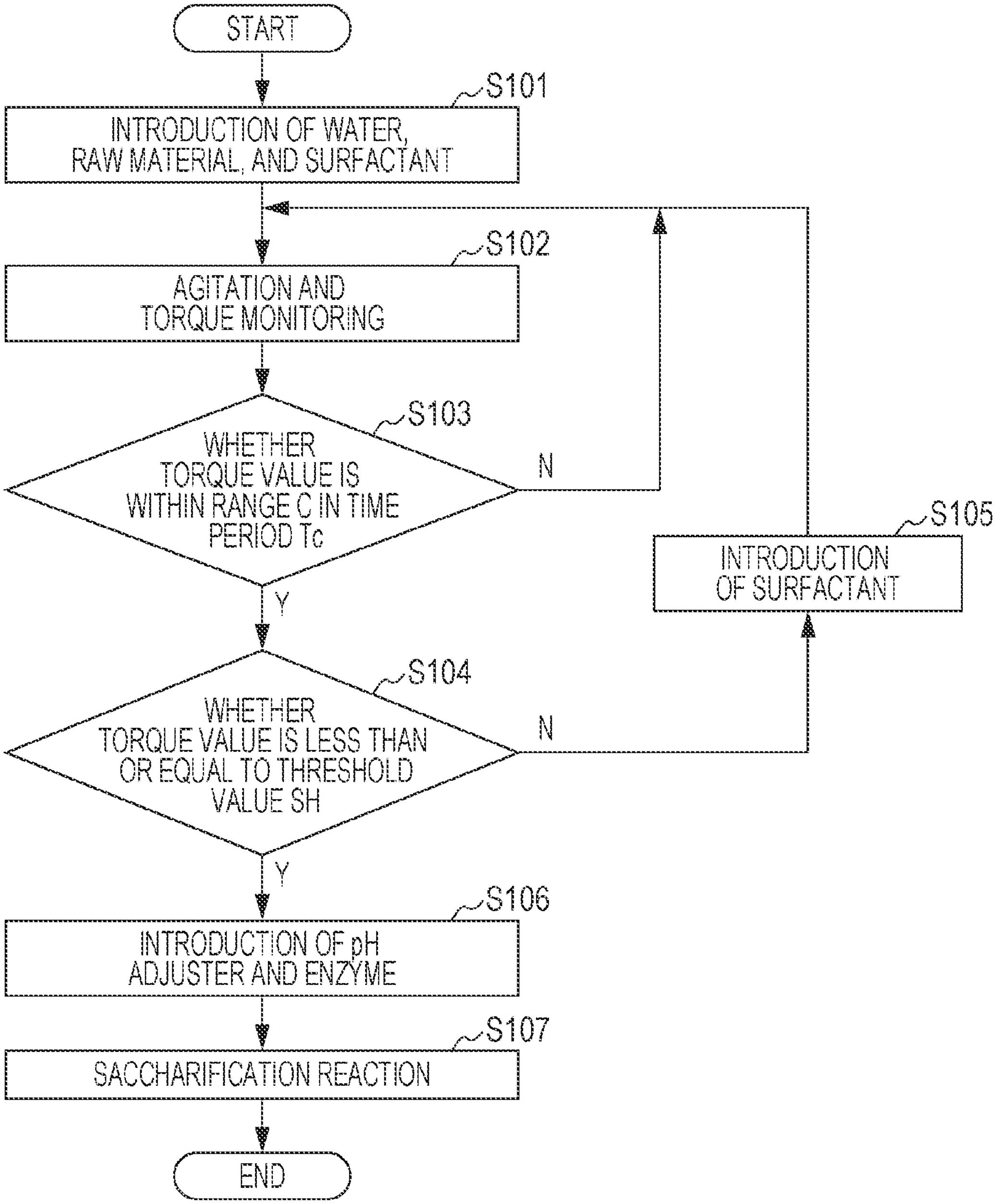
FIG. 4 is a flow chart illustrating a saccharification method according to an embodiment.

FIG. 4 is a flow chart illustrating a saccharification method according to the present embodiment. Explanations are performed with reference to FIG. 4.

Initially, water, a raw material containing cellulose, and a surfactant are introduced into a saccharification vessel so as to obtain a liquid mixture (S101: introduction step). Subsequently, the liquid mixture is agitated due to rotation of an impeller portion and a torque sensed by the impeller portion is detected (S102: agitation step and detection step).

The torque value is monitored and whether an amount of the torque changed in a unit time period becomes less than or equal to a predetermined value is determined (S103). In Step S103, when the amount of the torque changed in a unit time period is not less than or equal to a predetermined value ("N" in S103), the agitation step and the detection step are continued (S102). In step S103, when the amount of the torque changed in a unit time period is less than or equal to a predetermined value ("Y" in S103), whether the torque value is less than or equal to a threshold value SH is determined (S104).

Regarding Step S104, when the torque value is not less than or equal to the threshold value SH ("N" in S104), the surfactant is introduced into the saccharification vessel (S105), and the agitation step and the detection step are continued (S102). Regarding Step S104, when the torque value is less than or equal to the threshold value SH ("Y" in S104), the enzyme and the pH adjuster are added to the saccharification vessel (S107) so as to start the saccharification reaction due to the enzyme (saccharification step).

Since the saccharification method according to the present embodiment includes the above-described flow, an unnecessary amount of the surfactant can be suppressed from being introduced. Therefore, the saccharification reaction being hindered from advancing due to introduction of an excessive amount of the surfactant can be reduced while the saccharification reaction is facilitated by the surfactant.

6. Other Steps, Variations, and the Like

The cellulose saccharification method according to the present embodiment may include, in addition to the above-described steps, for example, a pulverization step of pulverizing the raw material, a classification step of classifying the pulverized raw material, a recovery step of recovering the liquid in the saccharification vessel, and a washing step of washing the saccharification vessel.

In this regard, the pH of the liquid mixture after the enzyme and the pH adjuster are introduced may be adjusted in accordance with a pH suitable for the enzyme to be used. For example, when the enzyme to be used is Cellic Ctec2 (produced by Novozymes), the pH of the liquid mixture is 4.5 or more and 6.0 or less and preferably 5.0 or more and 5.7 or less. It is more favorable that the pH is adjusted before the enzyme is added.

Examples of the pH adjuster include acids or alkalis, such as acetic acid, sulfuric acid, and sodium hydroxide, and various buffers.

The temperature of the liquid mixture in the saccharification step is favorably adjusted to a temperature suitable for the enzyme to be used. For example, when the enzyme to be used is Cellic Ctec2 (produced by Novozymes), the temperature of the liquid mixture is 47° C. or higher and 52° C. or lower, preferably 48° C. or higher and 51° C. or lower, and more preferably 49° C. or higher and 50° C. or lower.

The temperature of the liquid mixture in the saccharification vessel is adjusted using an appropriate heating apparatus, cooling apparatus, control apparatus, or the like.

The above-described embodiments and the modified examples are no more than exemplifications and the present disclosure is not limited to these. For example, each embodiment and each modified example may be appropriately combined.

The present disclosure includes substantially the same configuration as the configuration described in the embodiment, for example, a configuration having the same function, method, and result or a configuration having the same purpose and advantage. In addition, the present disclosure includes a configuration in which non-essential portions of the configuration described in the embodiment are replaced. The present disclosure includes a configuration which exerts the same operation and advantage of the configuration described in the embodiment or a configuration which can achieve the same purpose. The present disclosure includes a configuration in which a known technology is added to the configuration described in the embodiment.

The following contents are derived from the above-described embodiments and modified examples.

A cellulose saccharification method includes an introduction step of introducing water, a raw material containing cellulose, and a surfactant into a saccharification vessel so as to obtain a liquid mixture, an agitation step of agitating the liquid mixture due to rotation of an impeller portion, and a detection step of detecting a torque sensed by the impeller portion, wherein regarding the agitation step, after agitation is performed until an amount of the torque changed in a unit time period becomes less than or equal to a predetermined value, when the torque is more than or equal to a threshold value, the surfactant is additionally introduced into the liquid mixture, or when the torque is less than the threshold value, a pH adjuster and an enzyme are introduced into the liquid mixture.

When the agitation step is started, (1) since the cellulose is gradually immersed into the liquid mixture, a torque applied to the impeller portion increases during agitation, and when immersion is finally completed, the torque is saturated (an amount of the torque changed in a unit time period becomes less than or equal to a predetermined value). (2) Herein, due to the surfactant being added and agitation being further performed, precipitated cellulose is disaggregated and the torque is reduced.

According to the saccharification method, since introduction of the surfactant is completed when the torque becomes constant at a value less than or equal to the threshold value in the step (1) or (2) above, an unnecessary amount of the surfactant can be suppressed from being introduced. Therefore, the saccharification reaction being hindered from advancing due to introduction of an excessive amount of the surfactant can be reduced while the saccharification reaction is facilitated by the surfactant.

In the above-described saccharification method, the impeller portion may be located in a bottom portion of the saccharification vessel.

According to the saccharification method, the impeller portion being located in a bottom portion of the saccharification vessel enables the torque that is changed in accordance with the immersion state of the cellulose to be sensed with high sensitivity.

In the above-described saccharification method, the raw material may be paper containing a filler.

According to the saccharification method, even when a filler and the like are contained in the paper and hydrophobicity is developed so that the paper is not readily immersed into the liquid mixture, an effect of enabling the saccharification reaction being hindered from advancing due to introduction of an excessive amount of the surfactant to be reduced can be obtained while the saccharification reaction is facilitated by the surfactant.

In the above-described saccharification method, regarding the introduction step, the raw material in a pulverized state may be introduced into the saccharification vessel.

According to the saccharification method, the surface area of the raw material being increased enables the efficiency of the saccharification reaction to be improved. Further, even when the raw material is not limited to being readily immersed into the liquid mixture due to the pulverized raw material containing air so as to have a reduced specific gravity, the effect of the present disclosure can be obtained.

In the above-described saccharification method, the surfactant may be a nonionic surfactant.

According to the saccharification method, since the surfactant has no electric charge, the function of the enzyme is not readily hindered, and the saccharification reaction can be further facilitated.

What is claimed is:

1. A cellulose saccharification method comprising:

an introduction step of introducing water, a raw material containing cellulose, and a surfactant into a saccharification vessel so as to obtain a liquid mixture;

an agitation step of agitating the liquid mixture due to rotation of an impeller portion; and a detection step of detecting a torque sensed by the impeller portion, wherein regarding the agitation step, after agitation is performed until an amount of the torque changed in a unit time period becomes less than or equal to a predetermined value, when the torque is more than or equal to a threshold value, the surfactant is additionally introduced into the liquid mixture, or when the torque is less than the threshold value, a pH adjuster and an enzyme are introduced into the liquid mixture.

2. The cellulose saccharification method according to claim 1, wherein the impeller portion is located in a bottom portion of the saccharification vessel.

3. The cellulose saccharification method according to claim 1, wherein the raw material is paper containing a filler.

4. The cellulose saccharification method according to claim 1, wherein regarding the introduction step, the raw material introduced into the saccharification vessel is in a pulverized state.

5. The cellulose saccharification method according to claim 1, wherein the surfactant is a nonionic surfactant.

* * * * *